United States Patent
Moore et al.

(10) Patent No.: US 10,495,545 B2
(45) Date of Patent: Dec. 3, 2019

(54) SYSTEMS AND METHODS FOR DETERMINING RISK OF OPERATING A TURBOMACHINE

(71) Applicant: General Electric Company, Schenectady, NY (US)

(72) Inventors: Matthew Everett Moore, Atlanta, GA (US); Sameer Vittal, Atlanta, GA (US); Sanjeev Shyam Heda, Atlanta, GA (US); Alexander James Pistner, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 651 days.

(21) Appl. No.: 14/920,421

(22) Filed: Oct. 22, 2015

(65) Prior Publication Data
US 2017/0115182 A1  Apr. 27, 2017

(51) Int. Cl.
*G01M 15/14* (2006.01)
*G06F 17/18* (2006.01)
(Continued)

(52) U.S. Cl.
CPC ............ *G01M 15/14* (2013.01); *G06F 17/18* (2013.01); *G06Q 10/0635* (2013.01); *G06Q 10/06395* (2013.01); *G06Q 10/20* (2013.01)

(58) Field of Classification Search
CPC .... G01M 15/14; G06F 17/18; G06Q 10/0635; G06Q 10/06395; G06Q 10/20
(Continued)

(56) References Cited

U.S. PATENT DOCUMENTS

| 3,796,854 A | 3/1974 | Bennett et al. |
| 6,725,645 B1 | 4/2004 | Wadia et al. |

(Continued)

FOREIGN PATENT DOCUMENTS

| EP | 1405986 A2 | 7/2004 |
| EP | 1405986 A3 | 7/2004 |

(Continued)

OTHER PUBLICATIONS

Zaidi, Load Recognition for Automated Demand Response in Microgrid, 2010, IEEE.*

(Continued)

*Primary Examiner* — Michael P Nghiem
*Assistant Examiner* — Dacthang P Ngo
(74) *Attorney, Agent, or Firm* — Eversheds Sutherland (US) LLP (57) ABSTRACT

Systems and methods for determining risk to operating a turbomachine are provided. According to one embodiment of the disclosure, a method may include receiving historical risk profile data associated with a fleet of turbomachines by at least one processor from a repository. The method can also include receiving ambient conditions of an environment in which a turbomachine is to be operated. Based at least in part on the historical risk profile data and in view of the ambient conditions, at least one risk threshold for at least one known operating profile can be developed. The method may continue with determining that the at least one risk threshold for the at least one known operating profile is reached. Based at least in part on a determination that the at least one risk threshold is reached, a mitigating action associated with the turbomachine can be taken.

15 Claims, 6 Drawing Sheets

(51) Int. Cl.
*G06Q 10/06* (2012.01)
*G06Q 10/00* (2012.01)

(58) Field of Classification Search
USPC .......................................................... 702/179
See application file for complete search history.

(56) References Cited

U.S. PATENT DOCUMENTS

| | | | |
|---|---|---|---|
| 7,010,437 | B2 | 3/2006 | Lubkeman et al. |
| 7,677,075 | B2 | 3/2010 | Nies |
| 7,895,818 | B2 | 3/2011 | Snell et al. |
| 8,844,258 | B2 | 9/2014 | Ekanayake et al. |
| 2004/0065092 | A1 | 4/2004 | Wadia et al. |
| 2011/0268149 | A1* | 11/2011 | Chillar .................. G01J 5/0014 374/124 |
| 2011/0320181 | A1* | 12/2011 | Pandey .................. F01D 21/00 703/7 |
| 2012/0290104 | A1* | 11/2012 | Holt ....................... G06Q 10/00 700/29 |
| 2013/0199202 | A1 | 8/2013 | Zhang et al. |
| 2013/0327012 | A1 | 12/2013 | Mahabub et al. |
| 2013/0340439 | A1 | 12/2013 | Ekanayake et al. |
| 2014/0102113 | A1 | 4/2014 | Cuevas et al. |
| 2014/0144124 | A1 | 5/2014 | Mazumder et al. |
| 2014/0192356 | A1 | 7/2014 | Antikainen et al. |
| 2015/0033698 | A1 | 2/2015 | Cuevas et al. |
| 2015/0047368 | A1* | 2/2015 | Jones ....................... F02C 9/18 60/782 |

FOREIGN PATENT DOCUMENTS

| | | | |
|---|---|---|---|
| EP | 1405986 | B1 | 7/2004 |
| EP | 2 400 118 | A2 | 12/2011 |
| EP | 2 843 212 | A1 | 3/2015 |
| WO | WO 2013/127993 | * | 9/2013 ............ G05B 23/02 |

OTHER PUBLICATIONS

Extended European Search Report and Opinion issued in connection with corresponding EP Application No. 6194805.4 dated Jan. 20, 2017.

* cited by examiner

SYSTEMS AND METHODS FOR DETERMINING RISK OF OPERATING A TURBOMACHINE

TECHNICAL FIELD

This disclosure relates generally to turbomachines and, more particularly, to determining risk to operating a turbomachine.

BACKGROUND

Ambient conditions produce significant impact on operability and reliability of a turbomachine. Certain ambient conditions may result in operational issues for the turbomachine such as, for example, ice formation on inlet guide vanes, lean blow out, high dynamics, emissions, degradation, and so forth. These issues may make turbomachine operations unreliable, cause trips, and even cause physical damage to the turbomachine. For example, in a cold weather ice can develop on the inlet guide vanes. The ice can break off, travel downstream into the compressor, and cause significant damage. Another example is related to a sudden change in ambient temperature that can occur during seasonal temperature changes. When an ambient temperature suddenly decreases, the turbomachine can experience operability issues because the turbomachine is tuned to operate in a warmer environment and is not capable of operating in the colder environment.

Conventionally, operational issues caused by ambient conditions are addressed as they arise. Thus, to prevent ice damage, real-time temperature data may be analyzed and, if ice formation conditions exist, air traveling through the compressor can be directed to heat the inlet of the compressor. However, excessive application of inlet bleed heat (IBH) can lead to a reduction in performance of the turbomachine. Moreover, in some cases, ice formation can still occur with the IBH.

Robust designs that are capable of handling varying weather conditions have been used to avoid operational issues caused by ambient conditions. However, these designs may not be optimized for performance and costs due to their robustness.

BRIEF DESCRIPTION OF THE DISCLOSURE

The disclosure relates to systems and methods for determining risk of operating a turbomachine. According to one embodiment of the disclosure, a system is provided. The system can include a repository and at least one computer processor communicatively coupled to the repository. The repository can be configured to store historical risk profile data associated with a fleet of turbomachines. The computer processor can be configured to receive the historical risk profile data from the repository. The historical risk profile data can include historical failures and corresponding historical ambient conditions. The computer processor can be further configured to receive ambient conditions of an environment in which a turbomachine is to be operated. The ambient conditions can include detected or predicted weather data, specifically, atmospheric data, air composition, air particulates, a temperature, a humidity, a pressure, and so forth. The computer processor can be further configured to develop at least one risk threshold for at least one known operating profile based at least in part on the historical risk profile data in view of the ambient conditions. The at least one known operating profile of the turbomachine can include transient operations, a load of the turbomachine, an inlet guide vane angle, an inlet temperature, an inlet humidity, and an inlet dew point. The computer processor can determine that the at least one risk threshold for the at least one known operating profile is reached. Based on the determination, the computer processor can cause an action to be taken to avoid or mitigate an anomaly event associated with the risk. Furthermore, the system can include an on-site monitor configured to monitor operational data of the turbomachine associated with the at least one known operating profile and to send the operational data to the processor.

In another embodiment of the disclosure, a method is provided. The method may include receiving, from a repository, historical risk profile data associated with a fleet of turbomachines by a computer processor. The method may also include receiving ambient conditions of an environment in which a turbomachine is to be operated. Based at least in part on the historical risk profile data and in view of the ambient conditions, at least one risk threshold for at least one known operating profile can be developed. Development of the risk thresholds can involve clustering risk events using statistical techniques. The method may also include determining that the at least one risk threshold for the at least one known operating profile is reached. The determination can be indicative of icing on one or more inlet guide vanes (IGV) of the turbomachine, degradation caused by atmospheric dust, damage caused by corrosive contaminants, a lean blow out, high combustion dynamics, or excessive emissions. The determination can include matching signatures of the at least one known operating profile to signatures of the risk profile data using a pattern recognition algorithm parsed through a subset of the historical risk profile data. The pattern recognition algorithm can include at least one of the following: a dynamic time warping, a similarity based modeling, and a Gaussian mix. The method may also include causing an action to be taken based on the determination. The action can include applying bleed heat to an IGV, increasing a ramp-up speed, decreasing the ramp-up speed, determining an optimal time for online water washing, determining an optimal time for offline water wash, determining the necessity of a retune of the combustion system, wet compressing, manually controlling the bleed heat during a ramp-up cycle, or an optimal operation time. Additionally, the method may include mitigating an anomaly event associated with the risk.

In yet another embodiment of the disclosure, a further method is provided. The further method can include receiving, from a repository, historical risk profile data associated with a fleet of turbomachines by a processor. The historical risk profile data includes historical failures and corresponding historical ambient conditions. The method may also include receiving ambient conditions of an environment in which a turbomachine is to be operated. The ambient conditions include atmospheric data, a temperature, a humidity, and/or a pressure. A least one risk threshold for the at least one known operating profile can be developed based at least in part on the historical risk profile data and in view of the ambient conditions by clustering risk events using statistical techniques. The method may also include determining that the at least one risk threshold for the at least one known operating profile is reached. The method may also include necessitating an action to be taken based on the determination and implementing at least one recommendation to mitigate an anomaly event associated with the risk.

Other embodiments and aspects of the disclosure will become apparent from the following description taken in conjunction with the following drawings.

DETAILED DESCRIPTION

Example embodiments of the disclosure will be described more fully hereinafter with reference to the accompanying drawings, in which some, but not all, embodiments are shown. Indeed, the disclosure may be embodied in many different forms and should not be construed as limited to the embodiments set forth herein; rather, these embodiments are provided so that this disclosure will satisfy applicable legal requirements. Like numbers refer to like, but not necessarily the same or identical, elements throughout.

Certain embodiments of the disclosure described herein relate to methods and systems for determining risk to operating a turbomachine. Specifically, a system for determining risk to operating a turbomachine may provide for accurate and granular risk definition and analysis based on data concerning past events or accidents. Historical risk profile data may be collected from a fleet of turbomachines at the power plant level. The collected data together with weather data related to the historical risk profile data can be stored in a repository. The system for determining risk of operating a turbomachine can receive the historical risk profile data and weather data and analyze the historical risk profile data and weather to develop risk thresholds for operating profiles in view of the ambient conditions.

The turbomachine may be monitored to determine whether a risk threshold has been reached and instruct an operation on what actions associated with the turbomachine can be taken to avoid a risk of anomaly events. Additionally, the system for operating a turbomachine may predict anomaly events prior to their occurrence based on weather forecast. The system for operating the turbomachine may simulate operating conditions for the turbomachine based on weather forecast data. An analysis can be used to determine operating profiles associated with the risk of anomaly event under the ambient conditions according to the weather forecast. Subsequently, safe and risky operating profiles may be provided to the operator, for example, via a user interface associated with the system for determining risk of operating the turbomachine.

The technical effects of certain embodiments of the disclosure may include improving reliability and performance of the turbomachine, avoiding ice accumulation on the inlet guide vanes of the turbomachine and resulting compressor damage, reducing the number of trips, and optimizing water wash practices. Further technical effects of certain embodiments of the disclosure may include providing data concerning anomaly events in turbomachines to improve mechanical and control design of new units and upgrade of existing units. Moreover, the technical effects of certain embodiments of the disclosure may include keeping exhaust gases of the turbomachine within predefined emissions limits.

Figure 1:
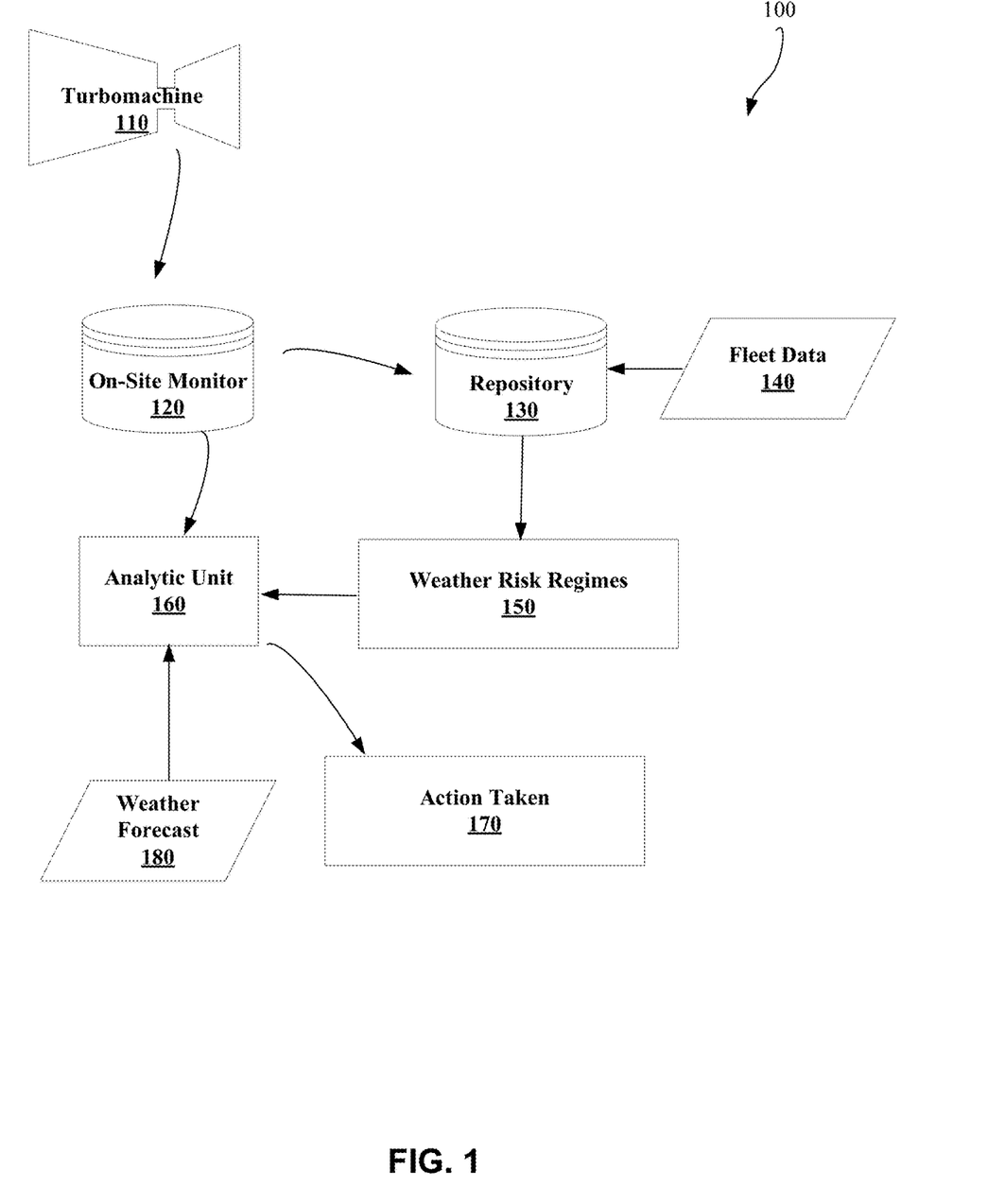
FIG. 1 is a block diagram illustrating an example environment suitable for implementing systems and methods for determining a risk of operating a turbomachine.

The following provides the detailed description of various example embodiments of the disclosure related to systems and methods for operating a turbomachine. Referring now to FIG. 1, a block diagram illustrates an example system environment 100 suitable for implementing systems and methods for determining risk of operating a turbomachine 110, in accordance with one or more example embodiments of the disclosure. The risk of operating the turbomachine includes the probability of occurrence of anomaly events, specifically, icing on one or more inlet guide vanes (IGV) of the turbomachine 110, degradation caused by atmospheric dust, damage caused by corrosive contaminants, a lean blow out, high combustion dynamics, excessive emissions, and so forth.

In some example embodiments, the turbomachine 110 may be part of a fleet associated with a power plant and may include a gas turbine. Operational data associated with the turbomachine 110 as well as operational data associated with other turbomachines in the fleet may be communicated via an on-site monitor 120 to a repository 130 and/or analytic unit 160.

Fleet data 140 may be collected at a power plant and stored to the repository 130. The fleet data 140 can includes historical risk profile data (e.g. historical failures and corresponding historical ambient conditions). A statistical analysis can be applied to the fleet data 140 to identify weather risk regimes 150 (see FIG. 2). The fleet data 140 related to the weather risk regimes 150 may be received from the repository 130 by an analytic unit 160.

The analytic unit 160 can also receive weather forecast 180 from one or more external sources. The weather forecast 180 can provides data concerning ambient conditions of an environment in which the turbomachine 110 is to be operated, specifically, atmospheric data, air composition, air particulates, ambient temperature, ambient humidity, inlet relative humidity, pressure, pressure drop, and so forth. In various embodiments, the weather forecast 180 includes detected weather data or predicted weather data.

Using the weather risk regimes 150, the analytic unit 160 can develop risk thresholds for operating profiles of the turbomachine 110 in the ambient conditions according to the weather forecast 180. The operating profiles can include one or more transient operations, a load of the turbomachine, an IGV angle, an inlet temperature, an inlet humidity, or an inlet dew point, and so forth. The analytic unit 160 can determine that a risk threshold for one or more of the operating profiles is reached. When the analytic unit 160 determines that the risk threshold is reached, one or more actions 170 associated with the turbomachine 110 may be advised to be taken. The actions 170 may allow transitioning to another operating profile or applying specific measures to mitigate or eliminate ice formation, lean blow out, excessive emissions, and so forth. The actions can include applying bleed heat to an IGV, increasing a ramp-up speed, decreasing the ramp-up speed, determining an optimal time for online water washing, determining an optimal time for offline water washing, determining the necessity of a retune of the combustion system, wet compressing, manually controlling the bleed heat during a ramp-up cycle, an improved operational time, and the like.

For example, the ambient conditions can indicate that the turbomachine 110 is operated in a dusty environment. Based on the historical data and information concerning turbomachine operating conditions, the analytic unit 160 can determine an optimal time for online or offline water washing of the turbomachine 110 and can inform an operator about that time in advance. Thus, online or offline water washing can be efficiently planned and implemented.

Figure 2:
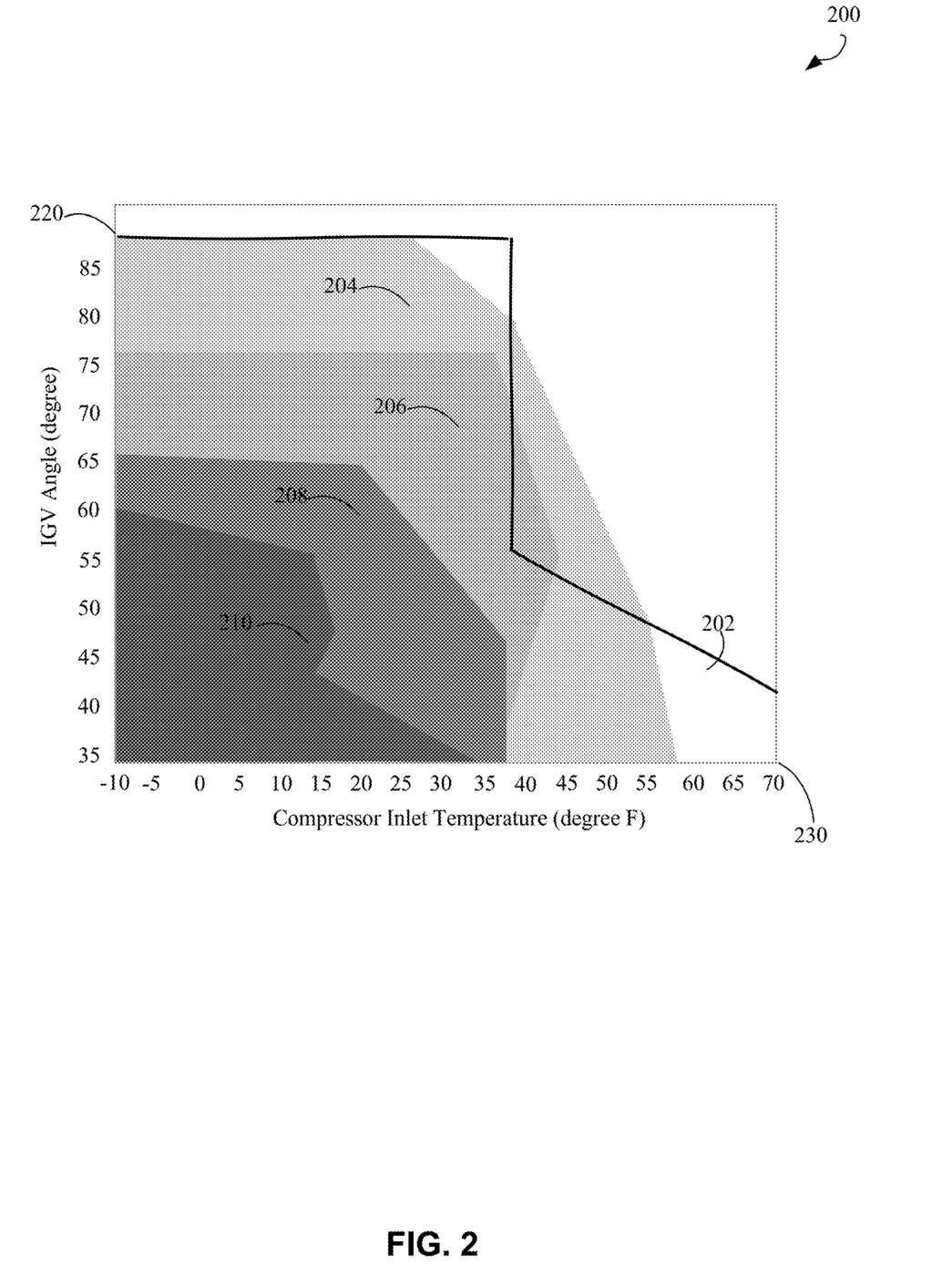
FIG. 2 is graph illustrating weather risk regimes identified based on historical risk profile data, in accordance with some example embodiments of the disclosure.

FIG. 2 is a graph 200 representing example weather risk regimes identified based on certain historical risk profile data according to an embodiment of the disclosure. The weather risk regimes are shown in relation to IGV angle 220 and compressor inlet temperature 230. Conventional risk regimes are loosely defined and binary in nature (risk or no-risk). Thus, area 202 shows a conventional risk regime which has no gradation and can only indicate whether a certain risk is present. In contrast, weather risk regimes defined by the system for determining risk of operating a turbomachine are granular and represent a degree of risk ranging from a high risk shown by area 210 to a very low risk shown by area 204. Area 206 shows a low risk and area 208 shows a moderate risk. A granular definition of risks provides for accurate estimation of impacts caused by using a specific operating profile. For example, an operating profile associated with a very low risk in area 204 can still be used if this operating profile is beneficial in other aspects.

It should be understood that the risk definition scheme illustrated by FIG. 2 is just an example. In various embodiments, risk definition schemes including more granular or less granular risk regimes can be used.

Figure 3:
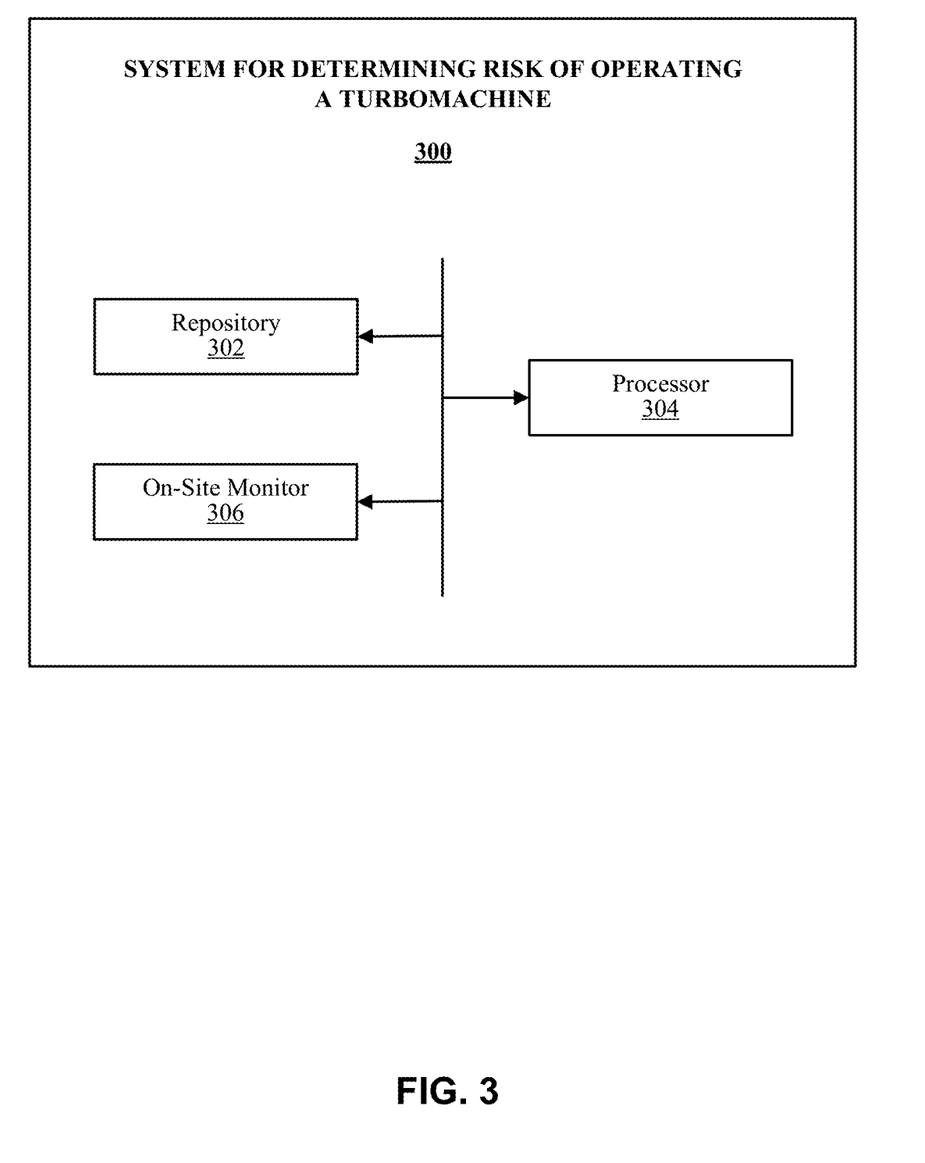
FIG. 3 is a block diagram showing various modules of the system for determining a risk of operating a turbomachine, in accordance with certain embodiments

FIG. 3 is a block diagram showing various example modules of the system 300 for operating a turbomachine, in accordance with certain embodiments. In some example embodiments, the system 300 can include a repository 302, a processor 304, and an on-site monitor 306. The repository 302 may include at least one database in communication with the processor 304 and the on-site monitor 306. The processor 304 may include a programmable processor, such as, for example, a microcontroller, a central processing unit, and so forth. In other example embodiments, the processor 304 may include an application-specific integrated circuit or programmable logic array, such as a field programmable gate array, designed to implement the functions performed by the system 300 for determining risk of operating a turbomachine.

In various embodiments, the system 300 can be deployed by a controller configured to control operations of the power plant. The system 300 can reside inside or outside the power plant. If the system 300 resides outside the power plant the controller may be able to control the system remotely.

The repository 302 can be configured to receive and store historical risk profile data associated with a fleet of turbomachines. The historical risk profile data can be provided by the on-site monitor 306 and/or additional on-site monitors. The repository 302 can send the historical risk profile data to the processor 304. The processor 304 can receive the historical risk profile data from the repository 302. Various external sources can be used to acquire ambient conditions of an environment in which the turbomachine is operated. Based on the historical risk profile data and in view of the ambient conditions, the processor 304 can develop at least one risk threshold for at least one known operating profile and determine that the at least one risk threshold for the at least one known operating profile is reached. When the processor 304 determines that the risk threshold is reached, the processor 304 can cause an action to be taken to address the risk. For example, the processor 304 may cause an alarm indicating that the risk threshold is reached, display a request to modify the operating profile, and so forth.

The on-site monitor 306 can communicate with the turbomachine. The on-site monitor 306 can monitor operational data of the turbomachine associated with the at least one known operating profile and send the operational data to the processor 304.

Figure 4:
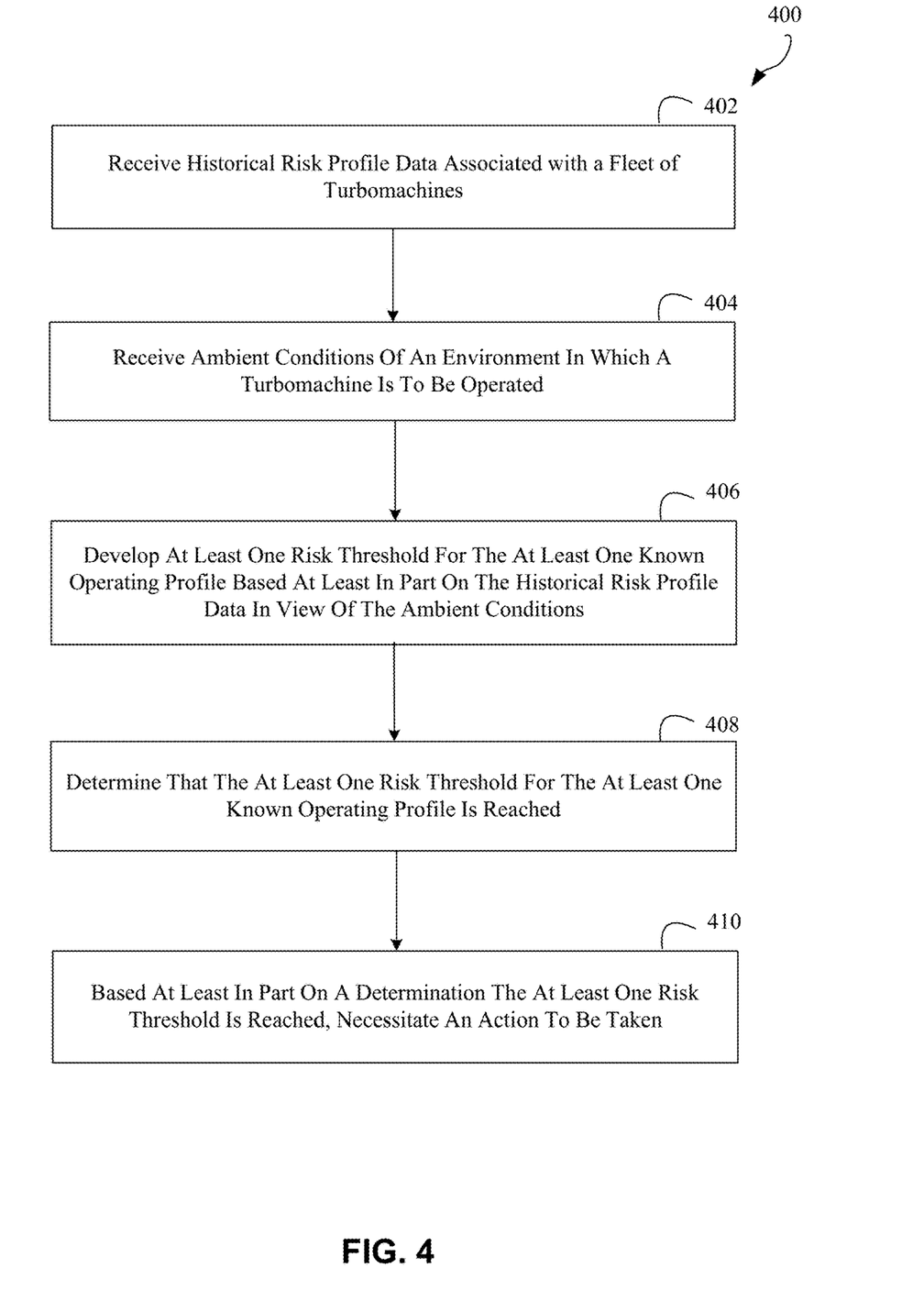
FIG. 4 is a process flow diagram illustrating a method for determining a risk of operating a turbomachine, in accordance with some example embodiments of the disclosure.

FIG. 4 depicts a process flow diagram illustrating an example method 400 for operating a turbomachine. The method 400 may be performed by processing logic that may include hardware (e.g., dedicated logic, programmable logic, and microcode), software (such as software run on a general-purpose computer system or a dedicated machine), or a combination of both. In one example embodiment of the disclosure, the processing logic resides at the processor 304 that can be part of controller 600 shown in FIG. 6. The controller 600 can, in turn, reside on a remote device or a server. The processor 304 may include processing logic. It should be appreciated by one of ordinary skill in the art that instructions said to be executed by the controller 600 may, in fact, be retrieved and executed by one or more processors. The controller 600 may also include memory cards, servers, and/or computer disks. Although the controller 600 may be configured to perform one or more steps described herein, other control units may be utilized while still falling within the scope of various embodiments of the disclosure.

As shown in FIG. 4, the method 400 may commence at operation 402 with receiving historical risk profile data associated with a fleet of turbomachines. The historical risk profile data can include information concerning historical failures associated with one of more of the turbomachines in the fleet and historical ambient conditions when the historical failures occurred. The historical failures can includes damage caused to a turbomachine by ice formation on IGV, a trip resulting from lean blow out, a damage caused by corrosive contaminants, a degradation caused by atmospheric dust, and so forth.

At operation 404, ambient conditions (e.g., atmospheric data, a temperature, a humidity, a pressure) associated with the turbomachine can be received. The ambient conditions may be actual conditions detected at the location of the turbomachine. Alternatively, the ambient conditions may be predicted based on a weather forecast received from a weather forecasting organization or some other source.

At operation 406, risk thresholds can be developed for known operating profiles in view of ambient conditions. The system 300 may consider operating profiles known to be experienced by the turbomachine, for example, ramping up, coming down, operating at a maximum power, and so forth. Information concerning the known operating profiles may be combined with the ambient conditions (e.g., temperature, humidity, pressure, and so forth). The combined information can be statistically analyzed to develop risk thresholds based on the historical risk profile data. The statistical analysis may cluster risk events associated with historical failures or otherwise determine the risk thresholds using the historical risk profile data. The clusters of risk events associated with risk regimes and corresponding operational profiles in corresponding ambient conditions can be identified as risk profiles based on the number of risk events. Regime risk thresholds can be identified for each risk profile.

At operation 408, the processor 304 may determine that a risk threshold for an operating profile is reached. Reaching the risk threshold may be based on actual ambient conditions or conditions simulated based on forecasted ambient conditions. Thus, the processor 304 may detect risks of an anomaly event in real time and predict risks that may arise in case of using certain operating profiles. For example, the risk of ice formation in the turbomachine operated according to a specific operating profile can be identified as 90%.

In order to determine risks, signatures of the operating profiles can be matched to signatures of the operating profiles associated with the historical risk profile data. Furthermore, a pattern recognition algorithm parsed through a subset of the historical risk profile data may be applied to determine that the risk threshold is reached. In various embodiments, the pattern recognition algorithm can include a dynamic time warping, a similarity based modeling, a Gaussian mix, and so forth.

At operation 410, the processor 304 may cause an action associated with the turbomachine to be taken based on a determination that the risk threshold is reached. The action can be displayed for the operator of the turbomachine, for example, as a recommendation to apply bleed heat to an IGV, increase a ramp-up speed, decrease the ramp-up speed, consider an optimal time for online water washing or offline water washing, retune the combustion system, use wet compressing, manually control the bleed heat during a ramp-up cycle, determine an optimal operation time, and so forth. For example, the processor 304 can predict that if the turbomachine is operated under the same operating profile for a certain period of time, a high level of icing risk exists.

In some embodiments, a recommendation to mitigate an anomaly event associated with the risk can be implemented automatically when the turbomachine suffers damage due to the anomaly event. Thus, the processor 304 can automatically change the operating profile of the turbomachine in a case of a high risk of ice formation on the IGV.

Figure 5:
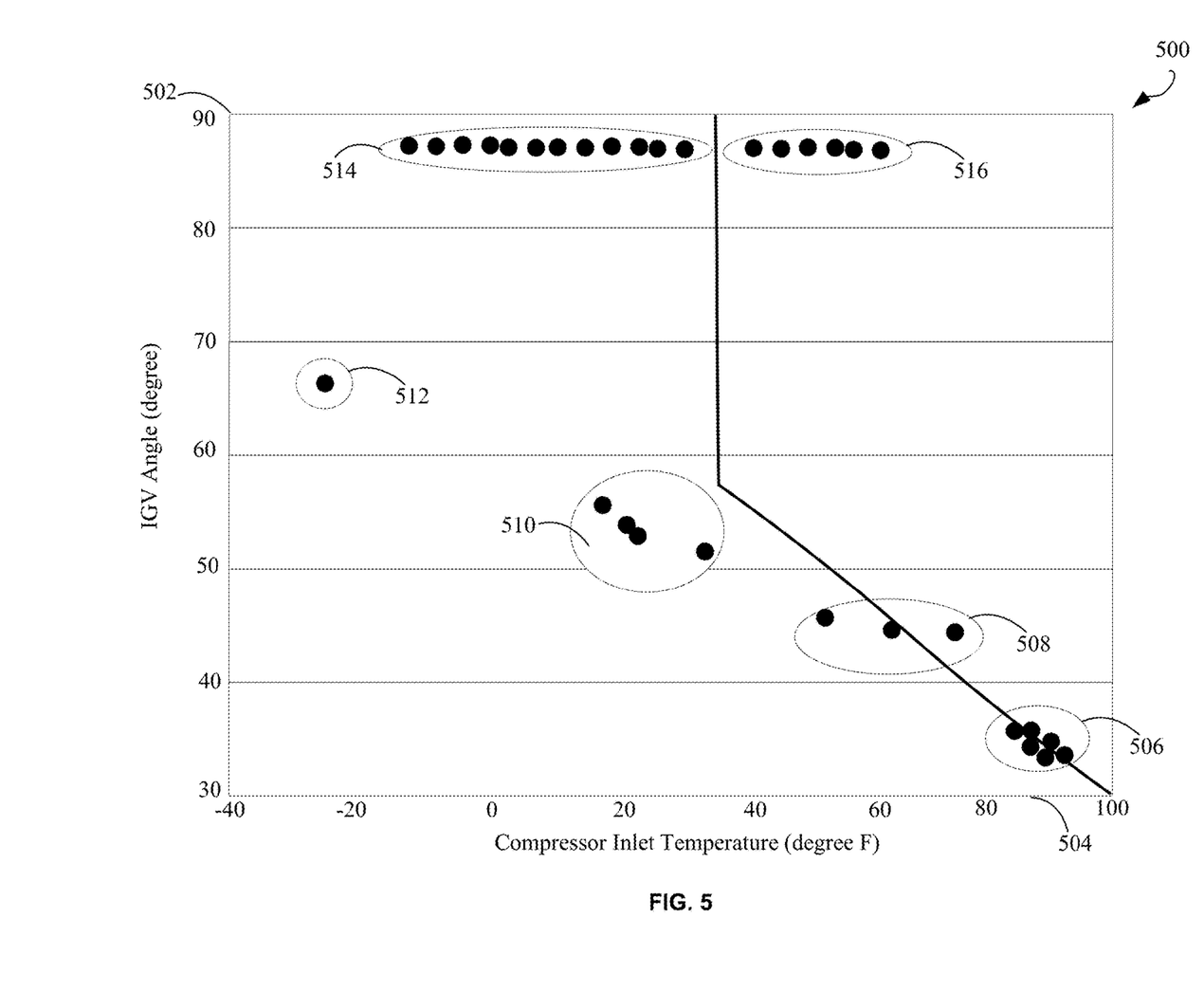
FIG. 5 is a plot illustrating risk events against an operating profile parameters and ambient condition parameters, in accordance with some example embodiments of the disclosure.

FIG. 5 is a plot 500 illustrating example risk events, in accordance with one or more example embodiments of the disclosure. The plot 500 shows ice formation events based on historical data in relation to IGV angle 502 and compressor inlet temperature 504. Based on time series analysis of the ice formation events, patterns of occurrence of anomaly events may be determined. Specifically, the system 300 may determine that ice formation events happen during the at least one of the following: the turbomachine is loading from steady-state part load operation 506, start of ramp up to full load 508, through high risk icing zone 510, during the end of ramp up and IGV opening 512, when IGVs are fully open and compressor inlet temperature increases 514, and to steady-state full load operation 516.

Analyzing the illustrated risk events can allow determining a pattern recognition algorithm that can be used by the system 300 to predict future occurrences of anomaly events and avoid conditions before they happen. Additionally, the system 300 can identify low risk conditions (e.g., at a base load) and inform the operator that no actions needs to be taken.

Figure 6:
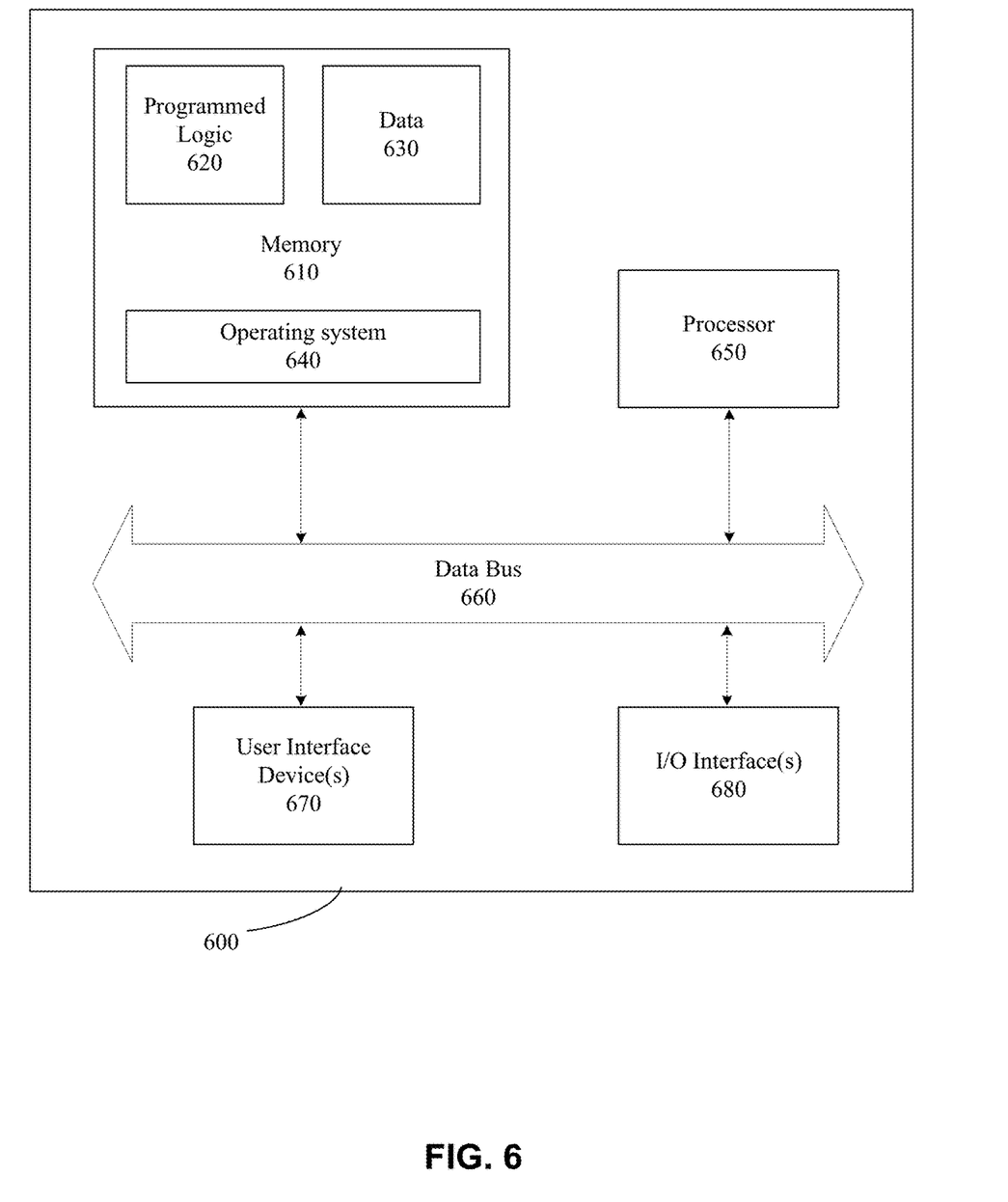
FIG. 6 is a block diagram illustrating an example controller configured to control a system for determining a risk of operating a turbomachine, in accordance with some example embodiments of the disclosure.

FIG. 6 depicts a block diagram illustrating an example controller 600 where the system 300 for determining risk of operating a turbomachine can reside, in accordance with an embodiment of the disclosure. More specifically, the elements of the controller 600 may be used to determine risk of operating a turbomachine. The controller 600 may include a memory 610 that stores programmed logic 620 (e.g., software) and may store data 630, such as historical risk profile data associated with a fleet of turbomachines, ambient conditions of an environment in which a turbomachine is to be operated, developed risk thresholds, and the like. The memory 610 also may include an operating system 640.

A processor 650 may utilize the operating system 640 to execute the programmed logic 620, and in doing so, may also utilize the data 630. A data bus 660 may provide communication between the memory 610 and the processor 650. Users may interface with the controller 600 via at least one user interface device 670, such as a keyboard, mouse, control panel, or any other devices capable of communicating data to and from the controller 600. The controller 600 may be in communication with the turbomachine online while operating, as well as in communication with the turbomachine offline while not operating, via an input/output (I/O) interface 680. More specifically, one or more of the controllers 600 may carry out determining of risks of operating a turbomachine, such as, but not limited to, receive historical risk profile data associated with a fleet of turbomachines, receive ambient conditions of an environment in which a turbomachine is to be operated, develop at least one risk threshold for at least one known operating profile based at least in part on the historical risk profile data in view of the ambient conditions, determine that the at least one risk threshold for the at least one known operating profile is reached, and based at least in part on a determination the at least one risk threshold is reached, necessitate an action to be taken. Additionally, it should be appreciated that other external devices or multiple other power plants may be in communication with the controller 600 via the I/O interface 680. In the illustrated embodiment of the disclosure, the controller 600 may be located remotely with respect to the turbomachine; however, it may be co-located or even integrated with the turbomachine. Furthermore, the controller 600 and the programmed logic 620 implemented thereby may include software, hardware, firmware, or any combination thereof. It should also be appreciated that multiple controllers 600 may be used, whereby different features described herein may be executed on one or more different controllers 600.

Accordingly, certain embodiments of the disclosure described herein can allow for optimized monitoring and potential recovery services, which lead to a fleet wide increase in reliability and availability. Additionally, understanding how often the turbomachine is operated in a risk regime (if the operator chose to not take any avoidance actions) can lead to improved outage planning and prevention of more serious compressor events (recommendation of inspections). An improved understanding of the causes of icing and the definitions of ice risk regimes can provide a basis for advanced turbomachine designs and controls upgrade opportunities.

References are made to block diagrams of systems, methods, apparatuses, and computer program products according to example embodiments of the disclosure. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based or programmable consumer electronics, mini-computers, mainframe computers, and the like.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above. Therefore, it is to be understood that the disclosure is not to be limited to the specific embodiments of the disclosure disclosed and that modifications and other embodiments of the disclosure are intended to be included within the scope of the appended claims. Although specific terms are employed herein, they are used in a generic and descriptive sense only and not for purposes of limitation.

What is claimed is:

1. A method for operating a turbomachine, the method comprising:
   receiving, by a processor, from a repository, historical failure data associated with a fleet of two or more turbomachines, wherein the historical failure data comprises turbomachine failure data and ambient conditions at the time of the turbomachine failure data;
   receiving, by a processor, ambient conditions of an environment in which a first turbomachine is to be operated;
   developing, by a processor, by clustering risk events, at least one risk threshold for at least one known operating profile based at least in part on the historical failure data in view of the ambient conditions of the environment in which the first turbomachine is to be operated;
   determining, by comparing some or all of the ambient conditions to the at least one risk threshold and applying pattern recognition to historical failure data, that the at least one risk threshold for the at least one known operating profile is reached; and
   based at least in part on a determination the at least one risk threshold is reached, facilitating a control action to change an operation of the first turbomachine, wherein the control action includes at least one of the following: applying bleed heat to one or more inlet guide vanes (IGV), increasing a ramp-up speed, decreasing the ramp-up speed, or controlling the bleed heat during a ramp-up cycle.

2. The method of claim 1, further comprising mitigating an anomaly event associated with the risk.

3. The method of claim 1, wherein the developing the at least one risk threshold includes clustering risk events using statistical techniques.

4. The method of claim 1, wherein the determining that the at least one risk threshold is reached includes matching signatures of the at least one known operating profile to signatures of the historical failure data.

5. The method of claim 4, wherein the determining that the at least one risk threshold is reached includes using a pattern recognition algorithm parsed through a subset of the historical failure data.

6. The method of claim 5, wherein the pattern recognition algorithm includes at least one of the following: a dynamic time warping, a similarity based modeling, and a Gaussian mix.

7. The method of claim 1, wherein the determining that the at least one risk threshold is reached is indicative of at least one of the following events: icing on one or more inlet guide vanes (IGV) of the turbomachine, degradation caused by atmospheric dust, damage caused by corrosive contaminants, a lean blow out, high combustion dynamics, or excessive emissions.

8. The method of claim 1, wherein the at least one known operating profile of the turbomachine includes at least one of the following: transient operations, a load of the turbomachine, an IGV angle, an inlet temperature, an inlet humidity, or an inlet dew point.

9. The method of claim 1, wherein the ambient conditions includes at least one of the following: atmospheric data, air composition, air particulates, a temperature, a humidity, or a pressure.

10. The method of claim 1, wherein the historical failure data is collected at a power plant level and stored in the repository.

11. A system for operating a turbomachine, the system comprising:
    a repository configured to store historical failure data associated with a fleet of turbomachines, wherein the historical failure data comprises turbomachine failure data and ambient conditions at the time of the turbomachine failure data;
    a processor in communication with the repository and configured to:
    receive the historical failure data;
    receive ambient conditions of an environment in which a first turbomachine is to be operated;
    develop, by clustering risk events, at least one risk threshold for at least one known operating profile based at least in part on the historical failure data in view of the ambient conditions of the environment in which the first turbomachine is to be operated;
    determine, by comparing some or all of the ambient conditions to the at least one risk threshold and applying pattern recognition to historical failure data, that the at least one risk threshold for the at least one known operating profile is reached; and based on a determination the at least one risk threshold is reached, causing an action to change operation of the first turbomachine, wherein the action includes at least one of the following: applying bleed heat to one or more inlet guide vanes (IGV), increasing a ramp-up speed, decreasing the ramp-up speed, or controlling the bleed heat during a ramp-up cycle.

12. The system of claim 11, further comprising an on-site monitor configured to monitor operational data of the first turbomachine associated with the at least one known operating profile and to send the operational data to the processor.

13. The system of claim 11, wherein the determining that the at least one risk threshold is reached includes matching signatures of the at least one known operating profile to signatures of the historical failure data using a pattern recognition algorithm parsed through a subset of the historical failure data, the pattern recognition algorithm including at least one of the following: a dynamic time warping, a similarity based modeling, and a Gaussian mix.

14. The system of claim 11, wherein the at least one risk threshold is associated with at least one of the following: icing on one or more IGV of the first turbomachine, degradation caused by atmospheric dust, a damage caused by corrosive contaminants, a lean blow out, high combustion dynamics, or excessive emissions.

15. A method for operating a turbomachine, the method comprising:

receiving, by a processor, from a repository, historical failure data associated with a fleet of turbomachines, wherein the historical failure data includes turbomachine failure data and ambient conditions at the time of the turbomachine failure data;

receiving, by the processor, ambient conditions of an environment in which a first turbomachine is to be operated, wherein the ambient conditions include at least one of the following: atmospheric data, a temperature, a humidity, or a pressure;

developing, by the processor, by clustering risk events using statistical techniques, at least one risk threshold for the at least one known operating profile based at least in part on the historical failure profile data in view of the ambient conditions of the environment in which the first turbomachine is to be operated;

determining, by the processor, by comparing some or all of the ambient conditions to the at least one risk threshold and applying pattern recognition to historical failure data, that the at least one risk threshold for the at least one known operating profile is reached;

based on a determination the at least one risk threshold is reached, causing an action to control the first turbomachine, wherein the action includes at least one of the following: applying bleed heat to one or more inlet guide vanes (IGV), increasing a ramp-up speed, decreasing the ramp-up speed, or controlling the bleed heat during a ramp-up cycle.

* * * * *